Sept. 6, 1955  R. E. NOONAN  2,716,812
RIVET STEM CUTTING TOOL
Filed Jan. 2, 1953  2 Sheets-Sheet 1
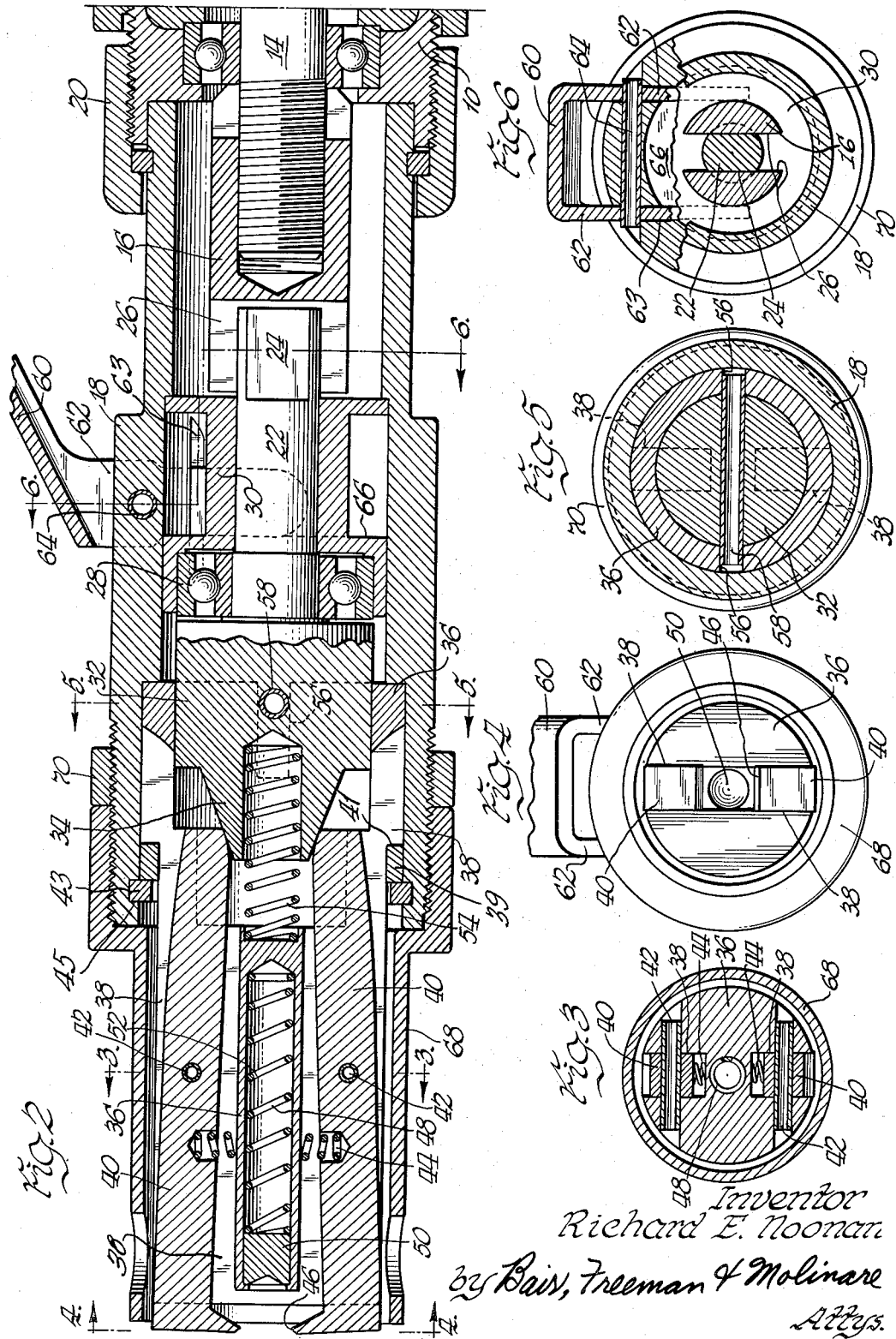
Inventor
Richard E. Noonan
by Bair, Freeman & Molinare
Attys.

Sept. 6, 1955     R. E. NOONAN     2,716,812
RIVET STEM CUTTING TOOL
Filed Jan. 2, 1953     2 Sheets-Sheet 2
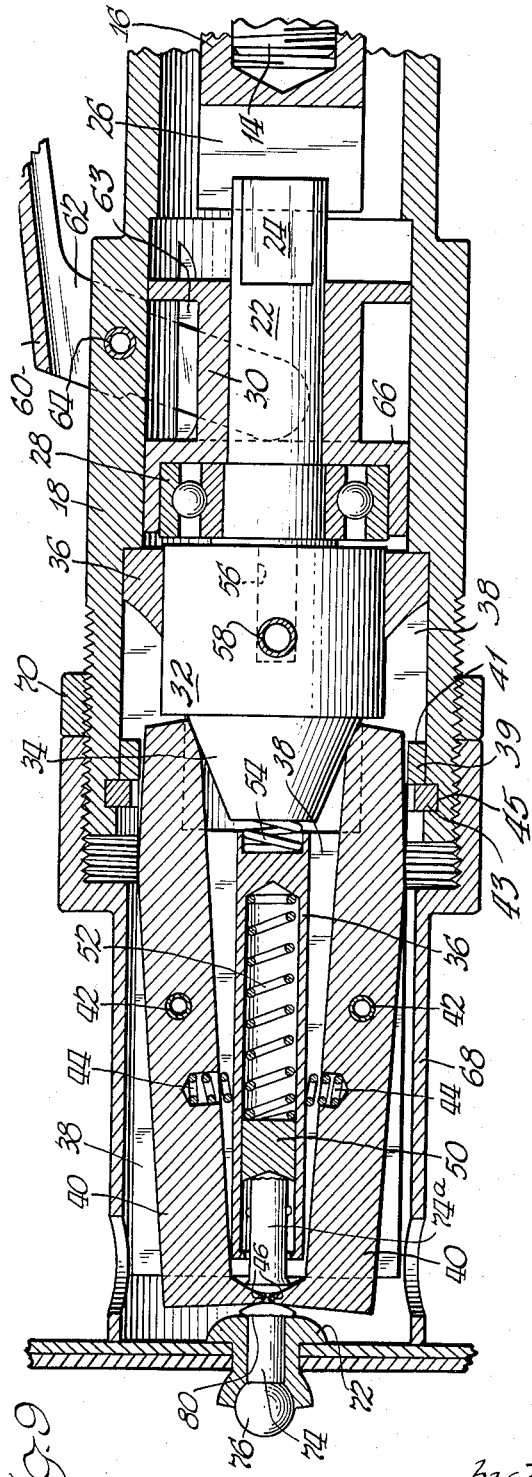
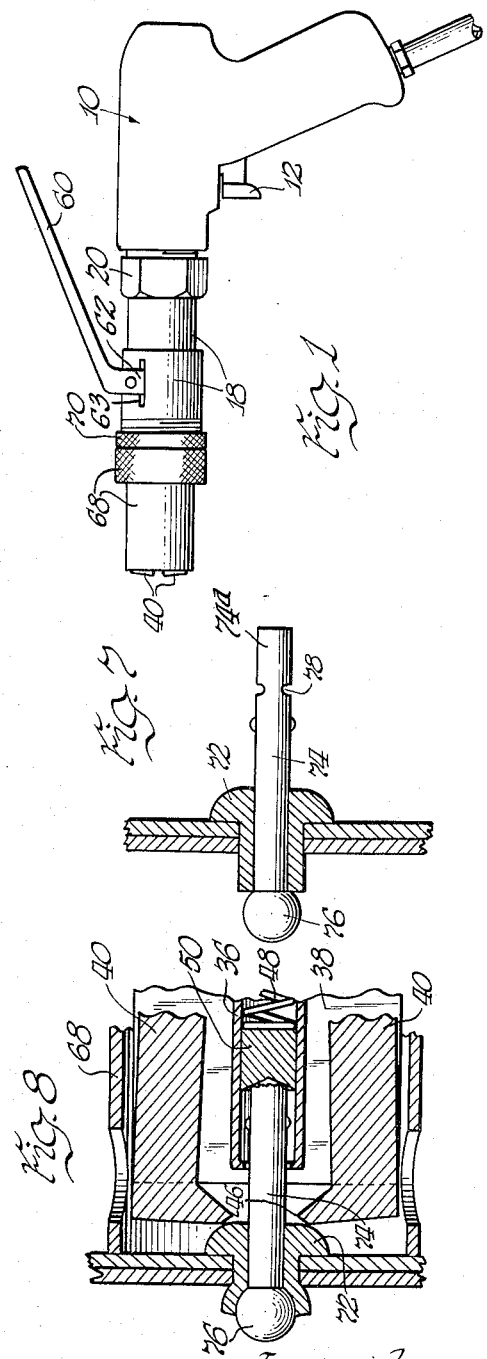
Inventor
Richard E. Noonan
by Bair, Freeman & Molinare
Attys.

United States Patent Office 2,716,812
Patented Sept. 6, 1955

2,716,812

RIVET STEM CUTTING TOOL

Richard E. Noonan, Bryan, Ohio, assignor to Aro Equipment Corporation, Bryan, Ohio Application January 2, 1953, Serial No. 329,417

4 Claims. (Cl. 30—94)

This invention relates to a cutting tool and particularly one which is designed to cut rivet stems of the "blind" type of rivet generally known as a "Cherry" rivet.

One object of the invention is to cut off the stem that projects from a tubular rivet after the riveting operation and to enlarge the cut-off end so that the stem is not thereafter dislocated with respect to the rivet. My tool also burnishes the enlarged end so as to leave a smooth surface that requires no further finishing after my tool has been used thereon.

Another object is to provide a tool of the nipper type wherein the nipper jaws are rotated for annularly enlarging the cut-off end of the stem and for burnishing this end with, final shape of the enlargement being somewhat in the form of a countersunk rivet, thereby preventing subsequent dislodgment of the stem with respect to the rivet which is undesirable particularly where blind rivets of the Cherry type are used in securing the skin plates to an air foil or the like, it being obvious that it is undesirable to have the loose stems inside the air foil and also undesirable to expose the interior of the air foil to weather through the tubular rivet.

Still another object is to provide a tool of the general character just referred to which may be conveniently operated by an air or electric motor and readily coupled thereto and uncoupled therefrom so that different sizes of my tool may be substituted or the motor may be used for operating other types of tools.

A further object is to provide a cutting jaw arrangement in which the jaws are rotated and the rotation may be controlled by the rotation of the motor, whereas the cutting action may be at the same time manually controlled through a mechanism that brings the cutting jaws toward each other while they are being rotated.

Still a further object is to provide a gauge in connection with my tool which effects the proper positioning of the cutting edges of the jaws in respect to the rivet stem, and to provide means within the cutting jaws for ejecting the cut-off end of the rivet stem from the tool after the cutting operation has been completed.

With these and other objects in view, my invention consists in the construction, arrangement and combination of the various parts of my rivet stem cutting tool, whereby the objects contemplated are attained, as hereinafter more fully set forth, pointed out in my claims and illustrated in the accompanying drawings, wherein:

Figure 1 is a side elevation on a reduced scale showing my rivet stem cutting tool attached to an air motor of the pistol grip type.

Figure 2 is an enlarged vertical sectional view therethrough showing the various parts of the mechanism.

Figures 3, 4, 5 and 6 are vertical sectional views on the respective lines 3—3, 4—4, 5—5 and 6—6 of Figure 2 to show details of construction.

Figure 7 is a sectional view through a pair of plates or the like into which a Cherry rivet has been inserted together with its rivet stem and is accordingly ready for riveting.

Figure 8 is a sectional view similar to the left end of Figure 2 showing my tool associated with the rivet and stem of Figure 7 after the riveting operation and for the purpose of cutting the stem and heading it; and Figure 9 is a similar sectional view with addition of some of the parts shown in Figure 2 showing the relationship of these parts at the completion of the rivet stem cutting and heading operation, and also showing certain parts at different positions of adjustment than in Figure 2.

On the accompanying drawings I have used the reference numeral 10 to indicate an air motor of the pistol grip type which motors are usually provided with a control valve that can be opened by rearward movement of a trigger 12. Since the motor itself and the control valve form no part of my present invention, they have not been illustrated in detail with the exception of the motor shaft 14 shown in Figure 2 on which I mount a coupling member 16, the parts being suitably screw-threaded for tight inter-engagement.

My rivet stem cutting tool includes a stationary body 18 of tubular construction which is adapted to be secured to the motor 10 by a threaded coupling sleeve 20 in an obvious manner. Rotatable in the stationary body 18 is a drive shaft 22 which is slidably and non-rotatably connected with the coupling member 16 by means of flats 24 on the drive shaft in a slot 26 of the coupling member. The drive shaft 22 is rotatable in a radial bearing 28 and also in a spool 30 in which the bearing 28 is mounted. This spool is slidable in the bore of the body 18.

The drive shaft 22 has a head 32 terminating in a cone element 34. Also rotatable in the body 18 is a jaw carrier 36 in the form of a shaft-like element having opposite slots 38 therein as perhaps best shown in Figure 3. Adjacent the cone element 34, the jaw carrier 36 is encircled by a spacer ring 39 against a shoulder 41 of the carrier. An expansion snap ring 43 in a groove 45 of the body 18 engages the spacer ring to retain the jaw carrier in the body yet permit its rotation.

Pivoted in each slot 38 of the jaw carrier 36 is a jaw 40, the pivot being shown at 42. The inner ends of these jaws coact with the cone element 34 under the action of jaw spreading springs 44. The outer ends of the jaws are provided with cutting edges 46 directed toward each other. Between the jaws 40, the jaw carrier 36 has a bore 48 in which is an ejector plug 50 normally biased to the position shown in Figure 2 by a spring 52. Another spring 54 tends to keep the drive shaft 22 biased toward its inner limit of movement as in Figure 2.

A drive connection is provided between the drive shaft head 32 and the jaw carrier 36 consisting of opposite slots 56 in the jaw carrier and a tubular cross pin 58 having its ends slidable therein and having its central portion passing through the head 32 as shown in Figure 5.

For moving the spool 30 from the position of Figure 2 to the position of Figure 9, I provide a lever 60 which is forked as indicated at 62 in Figure 6 and pivoted on a pin 64. The depending arms 62 pass through slots 63 of the body 18 and are adapted to engage a flange surface 66 of the spool 30.

In connection with my tool, I provide a gauge tube 68, the purpose of which will hereinafter appear. The tube is threaded on the body 18 for adjustment purposes and a lock nut 70 is provided to retain the adjustment.

*Practical operation*

In the operation of my cutting tool, it normally is first associated with a rivet stem as shown in Figure 8. I have illustrated the operation in connection with a blind rivet 72 of the tubular type including a stem 74 having a head 76 and a weakened portion 78 (see Figure 7). This type of rivet is riveted by a special tool that grips the outer end portion 74a of the stem beyond the weakened portion 78 and pulls on it, thereby causing the head 76 to spread the inner end of the rivet as shown in Figure 8 until a predetermined tension is applied which is determined by the cross-sectional area at the weakened portion 78 where the stem fractures when that tension has been applied. The rivet then appears as in Figure 8.

Heretofore it has been customary to use bolt cutters or the like to cut off the stem and then grind the cut off part to smooth it. A bolt cutting or nipping operation, however, does not form a sufficient head on the stem to insure prevention of the stem from subsequently becoming dislocated from the rivet. I therefore provide a rotary nipper action, after association of the cutting tool with a rivet stem as in Figure 8. This is accomplished by rotating the jaws 40 at the same time their cutting edges 46 are engaged with the rivet stem and brought toward each other, the operation being accomplished by simultaneously depressing the trigger 12 and the lever 60.

As the cutting action progresses, the lever 60 is forced downwardly until it finally causes cutting edges 46 to break off the outer end portion 74a of the rivet stem as shown in Figure 9. As the wedge-like cutting edges 46 are brought together by rotation of the jaws 40 about the pivots 42, from the position of Fig. 8 to that of Fig. 9, the distance of separation between the head of the rivet and each of the respective cutting edges increases. The predetermined adjustment of, and the holding of the front end of the gauge tube 68 in position against the work plate, establishes a definite relation between the rivet and the cutting edges 46. Pivotal movement of the edges toward each other serves, therefore, to create a clearance space between the edges 46 and the rivet head. Movement of the wedged edges 46 through the outer stem portion 74a to effect cutting will serve, so long as gauge 68 is held against the work plates, to force excess stem material between the rivet head and the cutting edges, and the increasing cross-section of the inclined wedge-like form of the cutting edges will serve to compress such excess material therebetween. The aforesaid clearance space thereby provides a free path for outward lateral displacement of the compressed excess stem material. In this manner, a head 80 of larger diameter than the rivet stem 74 is formed. The head 80 serves to prevent the stem from thereafter becoming disassociated from the rivet. This head is formed annularly because of the rotation of the jaws and the jaws also perform a burnishing operation thereon so that the resulting finish is satisfactory without further attention after my tool is removed from the work.

After the tool is removed, the lever 60 may be released whereupon the spring 54 will force the drive shaft 22 inwardly from its extended position of Figure 9 to the position of Figure 2 which spreads the cutting edges 46 of the jaws 40 so as to release the rivet stem portion 74a whereupon the ejector plug 50 under the action of the spring 52 ejects 74a and the tool is then ready for another cutting operation.

The gauge tube 68 is adjusted to its inner limit in Figure 2. For a rivet of the size shown in Figure 7, the adjustment may be substantially as shown in Figures 8 and 9 so that the outer ends of the jaws 40 touch or nearly touch the head of the rivet 72. When they do touch, they make the stem head 80 of minimum side and serve to burnish the outer end of the rivet 72 as well as the head 80. If a larger head 80 is desired, the tube 68 may be adjusted farther out in respect to the body 18.

From the foregoing specification it will be obvious that I have provided a tool which is particularly adapted for cutting off rivet stems of blind rivets and properly finishing the cut-off end of the stem while at the same time it forms this end so that the stem remains permanently in position with respect to the rivet. While the device is particularly adapted for this type of cutting operation, obviously it may be used for cutting ordinary rivets or bolts and burnishing the cut end which is particularly desirable in connection with a bolt in order to prevent dislodgment of a nut thereon. It may also be used for cutting round or other shapes of bar stock into short pieces or for other desirable cutting operations.

Some changes may be made in the construction and arrangement of the parts of my rivet stem cutting tool without departing from the real spirit and purpose of my invention, and it is my intention to cover by my claims any modified forms of structure or use of mechanical equivalents which may be reasonably included within their scope.

I claim as my invention:

1. In a cutting tool of the character disclosed, a stationary body, a drive shaft rotatable and slidable therein, a jaw carrier rotatable therein and operatively connected with said drive shaft for rotation thereby, jaws pivotally mounted in said jaw carrier, a cone element carried by said drive shaft to spread said jaws at one end thereof when said drive shaft is slid relative to said stationary body, the other end of each jaw having a cutting edge to engage a rivet stem to be cut, power drive means for rotating said drive shaft and thereby said jaws, and manual actuator means to slide said drive shaft when rotating and thereby close said jaws, both of said means when in operation causing said cutting edges to cut the rivet stem and enlarge its outer end against the head of the rivet and burnish such outer end.

2. In a rivet stem cutter, a stationary body, a jaw carrier rotatable therein, jaws mounted in said jaw carrier and pivoted intermediate their ends, a cone element carried by said drive shaft for spreading said jaws at one end thereof when said drive shaft is slid relative to said stationary body, the other end of each jaw having cutting edges which are directed toward each other to engage a rivet stem to be cut, power drive means to rotate said drive shaft and thereby said jaws, manual actuator means to slide said drive shaft when rotating and thereby close said jaws, both of said means when in operation causing said cutting edges to cut the rivet stem and enlarge its outer end against the head of the rivet and burnish such outer end, and a gauge on said body adapted to engage the surface of an element from which the rivet stem projects to position said jaws in relation to such surface and the rivet stem, said gauge being adjustable relative to said stationary body.

3. A tubular housing having a cylindrical body rotatable and non-slidable therein, said body being provided with a pair of oppositely disposed slots, a pair of jaws each positioned in one of said slots, each of said jaws being pivotally secured to said body intermediate its ends and being provided with a cutting edge at its forward end, said body having a bore, a cone element slidably positioned in said bore, power drive means for rotating said body and thereby said jaws, and manual means to slide said cone relative to said body and thereby engage each of said jaws at its rear end, whereby said jaws while rotating are pivoted to close the forward ends thereof for bringing said cutting edges into engagement with an element to be cut.

4. A tubular housing having a cylindrical body rotatable and non-slidable therein, said body being provided with a pair of oppositely disposed slots, a pair of jaws each positioned in one of said slots, each of said jaws being pivotally secured to said body intermediate its ends and being provided with a cutting edge at its forward end, said body having a bore, a cone element slidably positioned in said bore, power drive means for rotating said body and thereby said jaws, manual means to slide said cone relative to said body and thereby engage each of said jaws at its rear end, whereby said jaws while rotating are pivoted to close the forward ends thereof for bringing said cutting edges into engagement with a rivet stem to be cut, and a tubular gauge member secured to said tubular housing, said gauge member being adapted to engage the surrounding surface of an element from which the rivet stem projects to position the forward ends of said jaws in relation to such surface and the rivet stem, said gauge being longitudinally adjustable relative to said body.

References Cited in the file of this patent

UNITED STATES PATENTS

| | | |
|---|---|---|
| 492,931 | Baird | Mar. 7, 1893 |
| 1,440,264 | Arn | Dec. 26, 1922 |
| 2,447,589 | Mellerio et al. | Aug. 24, 1948 |
| 2,457,417 | Trautmann | Dec. 28, 1948 |
| 2,526,955 | Kugler | Oct. 24, 1950 |
| 2,605,011 | Volpe | July 29, 1952 |